E. H. BLOODWORTH.
Cultivator.
No. 19,401.  Patented Feb. 16, 1858.
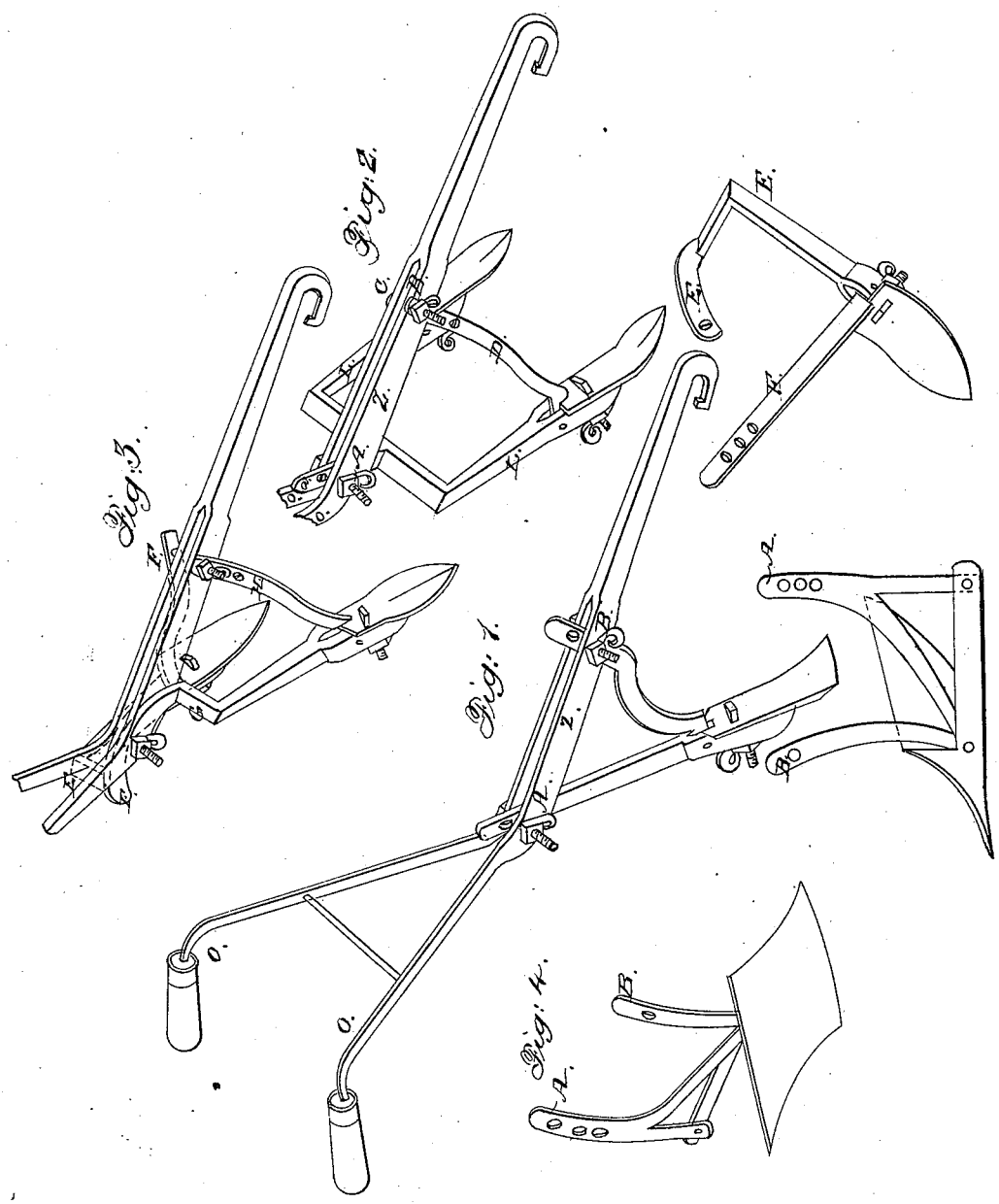

UNITED STATES PATENT OFFICE.

ELIJAH H. BLOODWORTH, OF THOMASTON, GEORGIA.

IMPROVEMENT IN PLOWS.

Specification forming part of Letters Patent No. 19,401, dated February 16, 1858.

*To all whom it may concern:*

Be it known that I, ELIJAH H. BLOODWORTH, of Thomaston, in the county of Upson and State of Georgia, have invented a new and Improved Iron Plow-Stock; and I do hereby declare that the following is a full and exact description thereof, reference being had to the accompanying drawings and letters of reference thereon.

The nature of my invention consists in the combination of a light and durable iron plow-stock and its double feet for farming purposes in the manner hereinafter shown, of which—

Figure 2 is a perspective view of my invention, showing the handles broken off.

To enable others skilled in the art to make and use my invention, I will now proceed to describe its construction.

I construct my stock as shown in Fig. 2 of the drawings. I attach to the beam Z and its handles O the double feet L. Shank *a* of the feet passes through the opening of the beam Z at A, and brace C is secured to the left outside of the beam at B, and brace D is secured to the right hand, outside of the beam, at B, by bolts passing through the beam Z at holes A and B, and laps applied to fasten them.

The plows can be made to run deep or shallow, at option, by passing the bolts through different holes in shank *a* or braces C D. Other figures on the drawings show mold-boards, shovels, &c., that may be attached to my stock.

What I claim as my invention, and desire to secure by Letters Patent, is—

The combination of beam Z and its handles O with the double feet L L and braces C D, the whole being arranged in the manner and for the purpose herein set forth.

ELIJAH H. BLOODWORTH.

Witnesses:
 R. O. PHIPPS,
 A. M. SMITH.